INVENTOR
Albert. H. Stebbins
BY
Robt. P. Haines
ATTORNEY

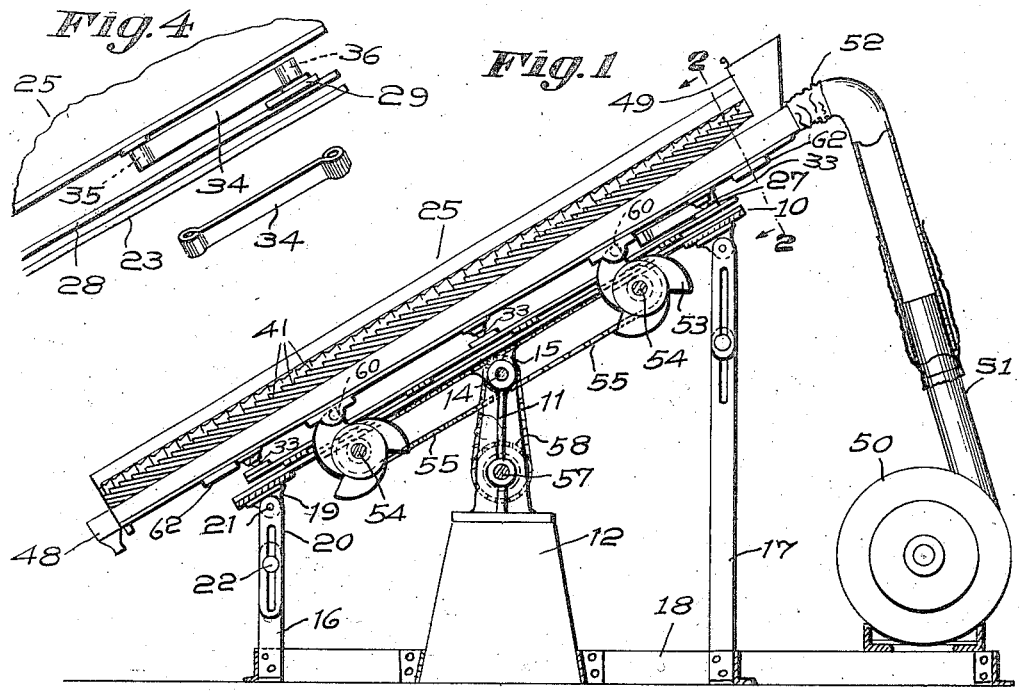
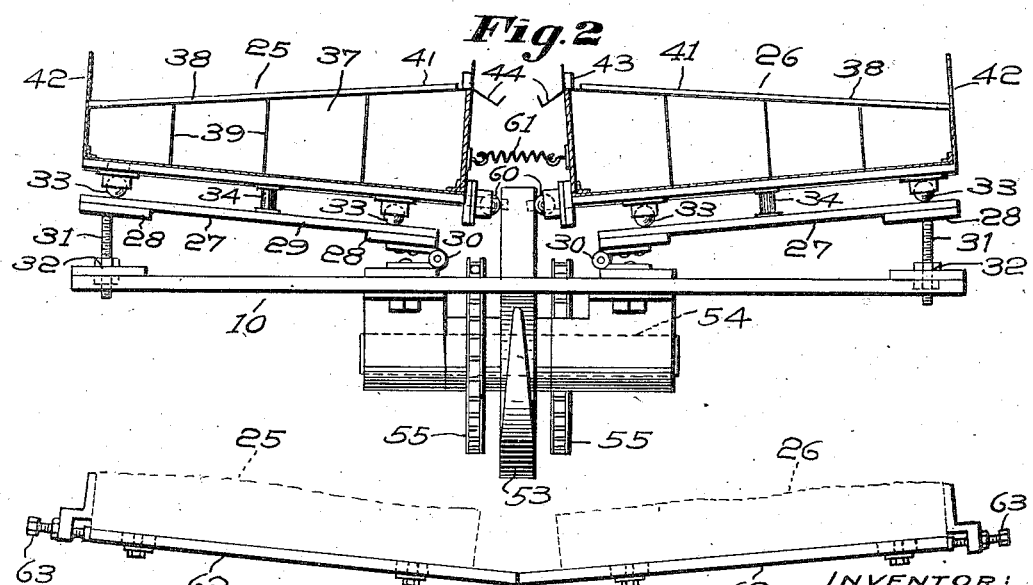

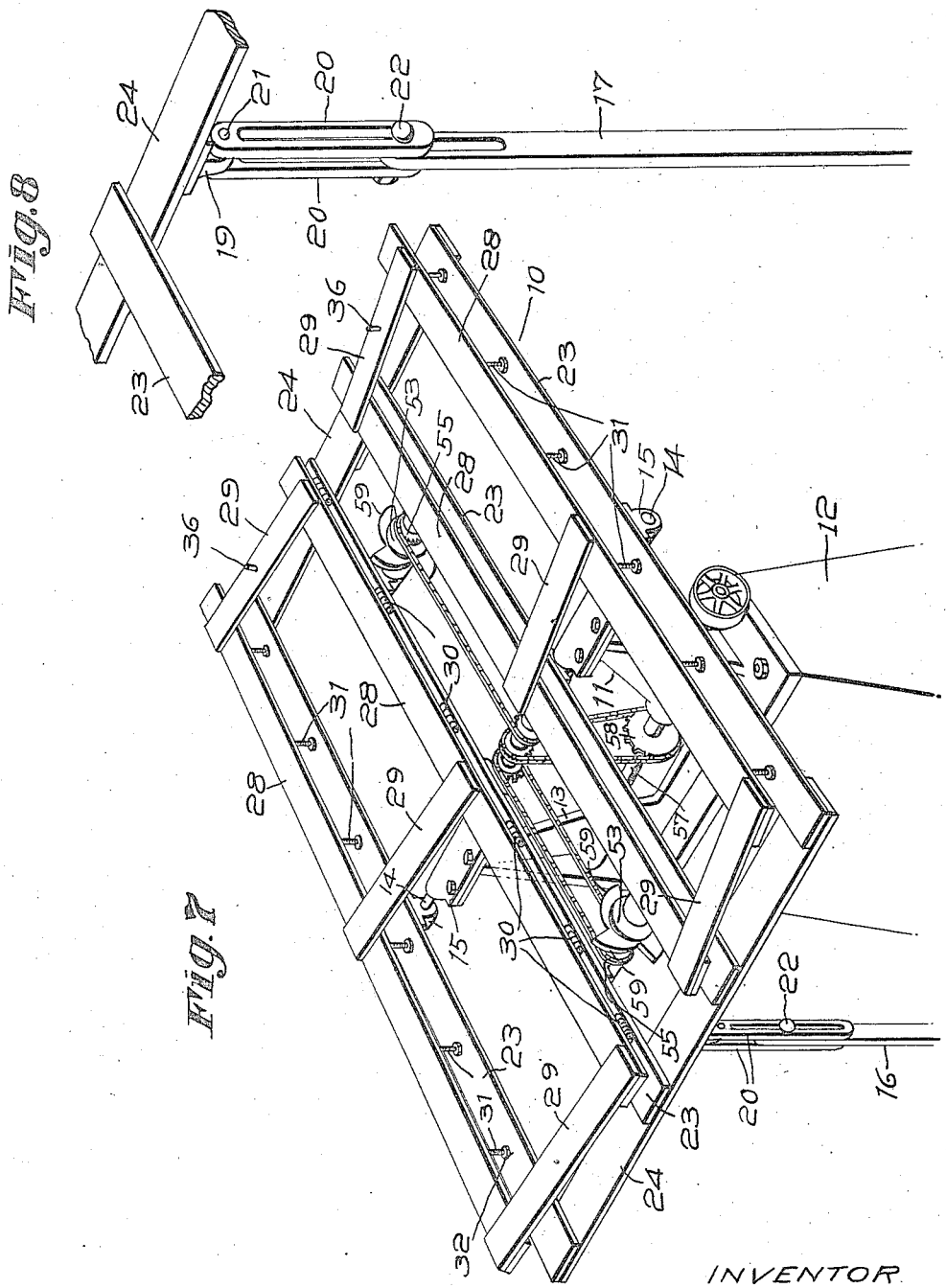

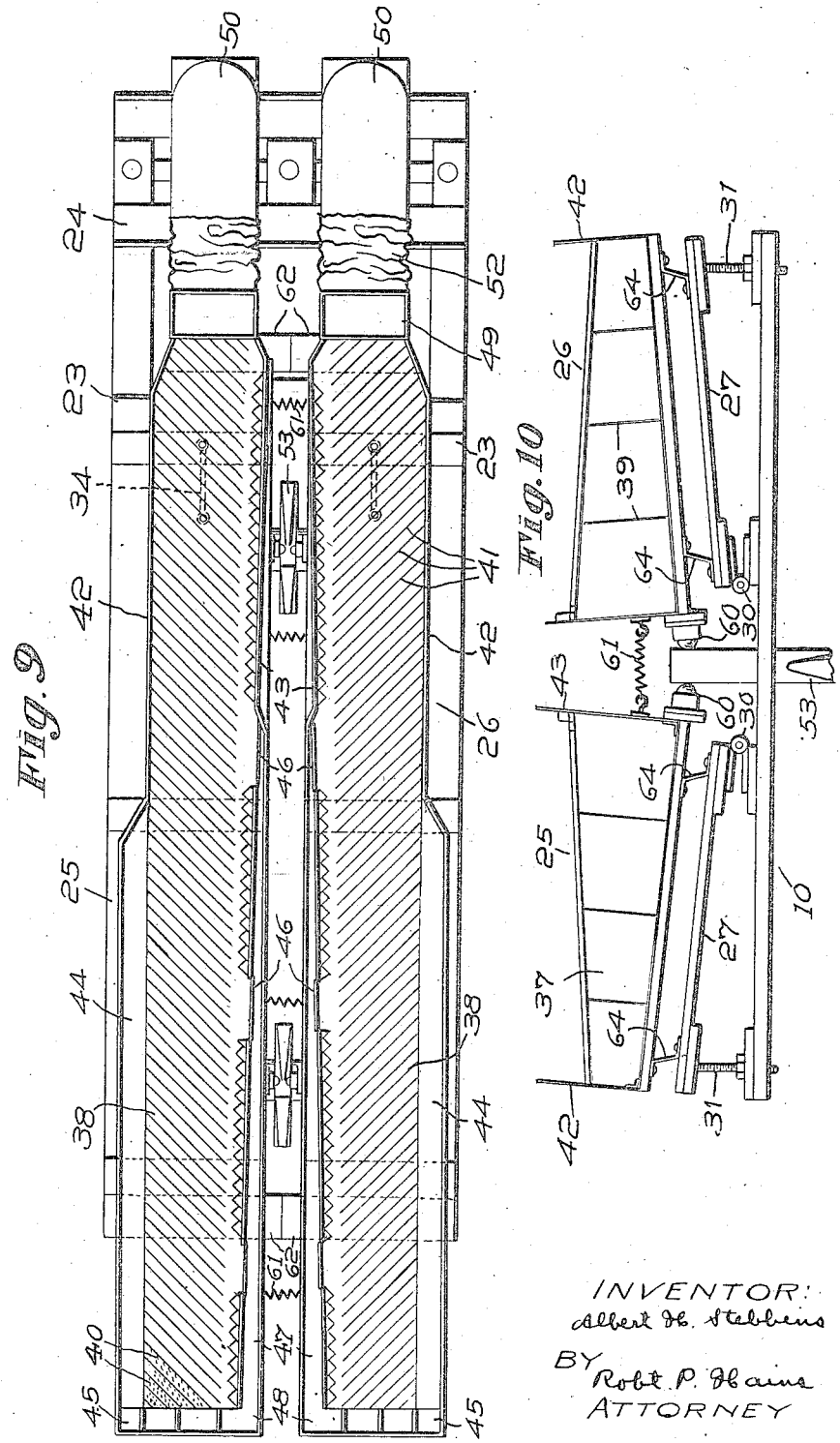

Patented Aug. 19, 1924.

1,505,737

UNITED STATES PATENT OFFICE.

ALBERT H. STEBBINS, OF LOS ANGELES, CALIFORNIA.

TABLE CONCENTRATOR.

Application filed May 19, 1922. Serial No. 562,124.

*To all whom it may concern:*

Be it known that I, ALBERT H. STEBBINS, a citizen of the United States, residing at Los Angeles, in the county of Los Angeles and State of California, have invented an Improvement in Table Concentrators, of which the following description, in connection with the accompanying drawings, is a specification, like characters on the drawings representing like parts.

This invention relates to concentrators of the table type for the separation of ores and other materials in accordance with their differences in specific gravity.

Most metals or values have a higher specific gravity than the accompanying impurities, and the values are usually distributed throughout a relatively large amount of impurities or foreign matter so that it is usually necessary to treat a large amount of material as compared to the amount of values obtained therefrom.

In ore concentration mills the materials to be treated are usually crushed to a predetermined size and are then subjected to the first concentration operation to remove some of the values at this stage. The tailings from the first concentration operation may be further crushed and subjected to a second concentrator. In this manner the materials are treated at various stages as they are reduced in size to remove some of the concentrates at each of these stages.

The concentrator of the present invention is designed more particularly for the separation of materials that have passed through the first stages just mentioned and have been reduced to a comparatively fine condition, although the present concentrator is not necessarily limited in use to fine materials.

Concentrator tables heretofore used are commonly provided with a deck surface over which the materials to be treated are passed, and riffles are disposed over the deck surface to direct the heavier materials in one direction while the lighter materials are permitted to travel in a different direction, and air is commonly passed upwardly through the materials to promote stratification. As the materials are reduced in size they will classify more slowly, and since a comparatively small force or movement may disturb the disposition of the light and heavy particles during their classification, it is important to treat these fine materials gently throughout the concentration thereof.

One of the features of the present invention therefore resides in a concentrator table having a deck supported at a relatively steep longitudinal angle to promote travel of the materials along the deck and to cause the materials to travel over a large number of inclined riffles, that the riffles may arrest the heavier particles.

Another feature of the invention resides in a pair of decks mounted for movement laterally toward and from each other with bumping effect.

Another feature of the invention resides in means for supporting a deck for adjustment to different inclinations both longitudinally and transversely.

And still another feature resides in novel means for imparting lateral movement to the decks.

Other features of the invention and novel combination of parts in addition to the above will be hereafter described in connection with the accompanying drawings which illustrate a good practical form thereof.

In the drawings:

Fig. 1 is a vertical sectional view taken between the decks of a concentrator constructed in accordance with the present invention, and shows one of the decks in side elevation;

Fig. 2 is an enlarged sectional view taken on the line 2—2 of Fig. 1;

Fig. 3 is a side view of boards secured to the decks to receive the bumping contact;

Fig. 4 shows a link to be described;

Fig. 7 is a perspective view of the deck supporting mechanism with the decks removed;

Fig. 8 is an enlarged perspective view of parts shown in Fig. 7;

Fig. 9 is a plan view looking down upon the decks of Fig. 1; and

Fig. 10 is a view similar to Fig. 2, but shows a modification of the invention.

Figure 5:
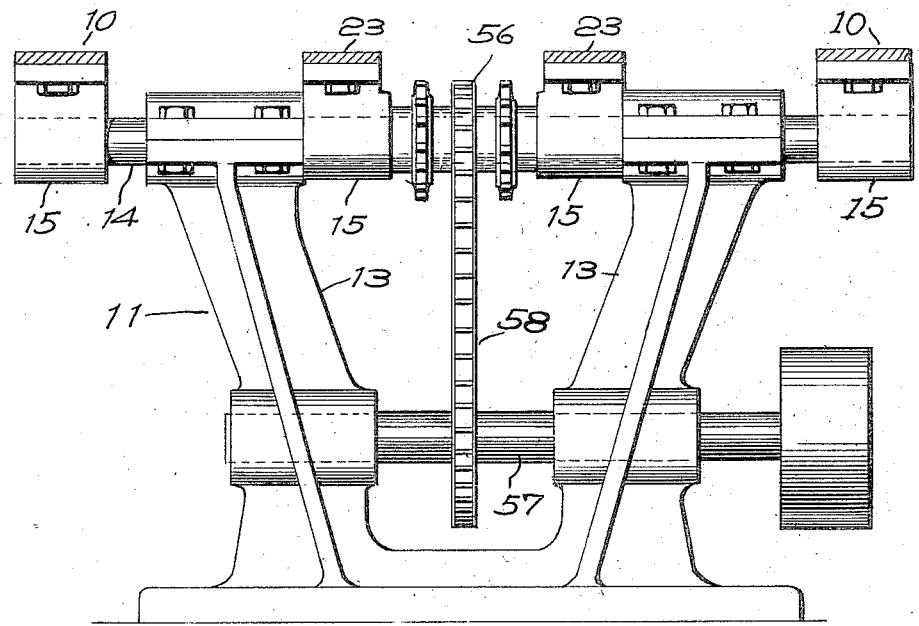
Fig. 5 is an enlarged side view of a stand upon which the deck supporting frame is swingingly mounted.

In the drawings a deck supporting frame 10 is shown as supported intermediate its ends by a stand 11 to which it is secured for adjustment to different longitudinal inclinations, and the stand 11 is mounted upon a block 12. The stand 11 has spaced upwardly extending arms 13 which support the transversely extending shaft 14, and the deck supporting frame 10 is provided with brackets 15 secured to the under face of the frame and through which the shaft 14 extends. The construction is such that the frame 10 is supported by the shaft 14 so that it may be swung to different inclinations about this shaft, and the frame 10 may be secured at the desired inclination by clamping the opposite ends of the frame to the posts 16 and 17 extending upwardly from the base 18. To this end lugs 19 are secured to the under face of the frame 10 at the opposite ends thereof, and a pair of links 20 pivoted to each lug at 21 extend downwardly to the posts and are slotted to receive bolts 22 which pass through the links and clamp them against the posts.

The deck supporting frame 10 may be constructed as best shown in Fig. 7 and consists of longitudinally extending beams 23 connected by transversely extending beams 24. Upon the frame 10, in the embodiment of the invention illustrated, are mounted a pair of decks 25 and 26 extending longitudinally of the frame 10 in substantially parallel relation, and in the present case the decks are supported for limited movement laterally toward and from each other.

The relatively steep slope at which the deck supporting frame 10 may be supported promotes travel of the materials along the deck and their travel may be further promoted by passage of air upwardly through the deck surface as will be described, but it may also be desirable to impart a slight bumping movement to the decks and the means to this end will now be described.

In the present construction the decks 25 and 26 rest upon deck carriages 27 mounted upon the frame 10 for adjustment to different transverse inclinations. The carriages 27 consist of longitudinally extending beams 28 connected by transverse beams 29, and the carriages are secured to the frame 10 by hinges 30. The opposite side of each carriage may be raised or lowered by threaded bolts 31 extending upwardly from the frame 10 and provided with nuts 32.

Figure 6:
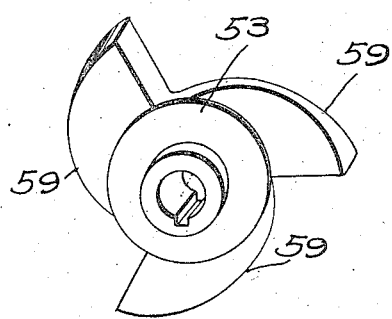
Fig. 6 is a perspective view of a cam to be described.

In the embodiment of the invention shown in Figs. 1 to 9 inclusive, the lower face of the decks 25 and 26 are provided with rollers 33 resting upon the beams 29 of the carriages so that the decks may be moved freely upon the carriage. Movement of the deck lengthwise in the direction in which the frame 10 slopes is prevented by links 34 having one end secured to the carriage 27 and the other end secured to the lower face of a deck as best shown in Fig. 4. The opposite ends of these links may have eyes that engage pins 35 and 36 secured to the carriage and deck respectively.

Each of the decks preferably constitutes an elongated casing having an air chamber 37 therein for supplying air to the deck surface 38 extending over the casing. Longitudinally extending partitions 39 within the chamber 37 serve to support the deck surface and to divide the chamber into longitudinally extending compartments. Each deck surface 38 has apertures 40 (see Fig. 9) formed therein throughout its length for the passage of air upwardly through the surface and the materials thereupon, and riffles 41 are provided extending diagonally across the deck surfaces.

The deck surface 38 of each deck is given a transverse inclination to impart movement to the materials toward the lower side 42 of each deck, and the riffles 41 extend in an inclined direction from the lower side of the deck toward the upper or concentrate side 43. As a result of this construction the lighter materials that pass over the top of the riffles will move toward the lower side 42 as they travel lengthwise of the deck, and the heavier materials that settle downwardly toward the deck surface will be directed by the inclined riffles toward the concentrate wall or side 43. The tailings that reach the lower side 42 may fall into an inclined trough 44 and travel along the trough to the hopper 45. The concentrates that reach the concentrate wall 43 may be removed through one or more gates 46 and may fall into the trough 47 that leads to the hopper 48.

The materials to be treated are delivered to the deck surface by hoppers 49, and air is forced into the chambers 37 below the deck surfaces and passes upwardly through the apertures 40. Air may be supplied to the decks by fans 50 mounted upon the base 18 and having conduits 51 leading to the upper end of the chambers 37. Since the deck supporting frame 10 may be adjusted to different inclinations, each conduit 51 preferably is provided with a telescopic joint as shown in Fig. 1, and a flexible connection 52 permits a slight movement of the decks relative to the air supply conduits.

In the construction shown the decks 25 and 26 have their concentrate walls 43 adjacent each other and the deck surfaces 38 slope away from each other, but this arrangement is not essential.

The steep longitudinal inclination at which the decks are supported, in combination with the passage of air upwardly through the deck surface may serve to effect travel of the materials over the deck surface, and the air will promote stratification so that the heavier materials will be directed by the riffles toward the concentrate wall while the tailings will pass over the top of the riffles toward the lower side 32. However, in most cases it may be desirable to impart a slight jolting or bumping movement to the decks to keep the particles moving and promote separation of the materials.

To this end, in the present case, rotating cams 53 are provided to force the decks apart a slight distance and then release them to bump together. Two cams 53 are shown as mounted upon shafts 54 positioned upon the opposite sides of the frame supporting shaft 14, and the cams may be driven by sprocket chains 55 driven by a gear 56 mounted upon the shaft 14. The gear 56 may be driven from a shaft 57 by a sprocket chain 58. The driving means just described is not disturbed by adjustment of the frame 10 to different inclinations.

The cams 53 are provided with several wedge portions 59, three being shown, and these portions enter between rollers 60 fastened to the decks 25 and 26. As a result the decks are forced apart as each wedge 59 passes between the rollers 60 and is then released. As soon as the decks are released they move down the inclined carriages toward each other, and springs 61 may serve to facilitate movement of the decks toward each other. Boards 62 (Fig. 3) secured to the lower face of the decks preferably serve to receive the bump, and the force with which the decks bump may be varied by adjusting the boards toward or from each other. Adjusting bolts 63 engaging the outer ends of the boards 62 serve to adjust the boards.

When the present concentrator is used to separate relatively fine materials, the bump imparted to the decks should be very slight and the air currents passing upwardly through the deck surface should be weak, since the stratification of the fine materials is readily disturbed. The movement imparted to the decks, in the present case, is at right angles to the length of the decks toward the concentrate walls, and is not of sufficient strength to overcome the tendency of the tailings to reach the lower side 42 of the deck.

As a result of the present construction the materials will travel lengthwise of the decks over a large number of riffles and some of the values may be arrested and deflected toward the concentrate wall by each riffle. This causes the materials to be treated or cleaned over and over again as they travel along the deck surfaces.

In Fig. 10 modified means is shown for movably mounting the decks 25 and 26 upon the carriers 27. In this modification the rollers 33 of Fig. 2 are replaced by upstanding flexible brackets 64 which support the decks in spaced relation to the carriages, and these brackets are sufficiently flexible to permit a limited movement of the decks toward and from each other. The opposite ends of the brackets may be bolted or otherwise secured to the deck and carriage respectively as shown.

What is claimed is:

1. A concentrator table comprising in combination, a deck frame supported at a longitudinal inclination, a pair of decks supported by the frame at a longitudinal inclination to promote travel of materials lengthwise of the decks, means for supporting the decks for movement transversely upon the frame to bump against each other to move the materials laterally, and riffles for directing the heavier materials diagonally across the decks.

2. A concentrator table comprising in combination, a deck frame supported at a longitudinal inclination, a pair of decks mounted upon the frame for movement relatively thereto transversely of the frame, operating means spaced lengthwise of the frame and adapted to act on each deck at spaced points to force the decks laterally away from each other and then release them to move toward each other with bumping effect, and riffles extending diagonally across the decks to direct the heavier materials against one side of each deck while the lighter particles flow over the riffles.

3. A concentrator table comprising in combination, a deck frame adjustable to different longitudinal inclinations, a pair of decks mounted upon the frame and adjustable thereupon to different transverse inclinations to impart a transverse movement to the lighter materials that flow over the riffles, means for delivering materials to the upper end of the decks to be advanced lengthwise of the deck by the inclination of the same, riffles extending in an inclined direction over the decks for directing the concentrates toward the upper side of each deck, and means for bumping the decks laterally to promote stratification of the materials.

4. A concentrator table comprising in combination, a deck frame supported at a longitudinal inclination, a pair of decks movably mounted upon the frame and supported thereby at an inclination in the direction of their length, means for delivering materials to the decks to travel lengthwise thereof, inclined riffles upon the decks for directing the heavier materials toward one wall of each deck while the lighter materials flow over the riffles, means for urging the decks laterally toward each other, and cam means operable between the decks to force them apart and then release them to move toward each other with bumping effect to impart a slight lateral movement to the materials as they travel lengthwise of the decks under the influence of gravity.

5. A concentrator table comprising in combination, a deck frame supported at a longitudinal inclination, a pair of decks provided with rollers for floatingly supporting them upon the frame, straps for limiting the movement of the decks in the direction in which the frame slopes, and means for forcing the decks laterally away from each other and then releasing them to bump against each other.

6. A concentrator table comprising in combination, a deck frame, a pair of decks movably supported by the frame and having material supporting surfaces over which the materials pass longitudinally of the decks, means for passing air upwardly through said surfaces and the materials thereupon, and means for effecting movement of one deck laterally toward and from the other with bumping effect to jar the materials laterally upon the deck surfaces.

7. A concentrator table comprising in combination, a deck frame, a pair of decks supported by the frame in substantially parallel relation and having deck surfaces that are inclined transversely, riffles extending diagonally over the deck surfaces, and means for imparting vibratory movement to the decks in a direction transversely to their length.

8. A concentrator table comprising in combination, a longitudinally inclined deck frame, a pair of decks supported by the deck frame so that the inclination of the latter causes the decks to slope in the direction of their length, means for supporting the decks so that they slope transversely upon the deck frame, and means for moving the decks transversely toward and from each other to vibrate them in a direction transversely to their length.

9. A concentrator table comprising in combination, a longitudinally inclined deck frame supported for adjustment to different longitudinal inclinations, a pair of decks supported by the deck frame so that they slope transversely upon the deck frame, means for delivering the materials to be treated to the upper ends of the decks, means for passing air upwardly through the deck and materials, and means for moving the decks laterally toward and from each other with bumping effect to vibrate the decks and materials thereupon.

10. A concentrator table comprising in combination, a deck frame mounted upon a transverse axis for adjustment to different longitudinal inclinations about the axis, a pair of decks supported by the deck frame so that the inclination of the latter causes the decks to slope in the direction of their length, means for supporting the decks so that they slope transversely upon the deck frame, mechanism for imparting relative movement to the decks to vibrate them in a direction transversely to their length, and means rotatable about said axis to impart movement to said mechanism.

11. A concentrator table comprising in combination, a deck supporting frame, a pair of decks extending lengthwise of the frame side by side in substantially parallel relation and supported by the frame for movement toward and from each other, means for forcing the decks away from each other and then releasing them, and spring means for moving the decks toward each other with bumping effect.

12. A concentrator table comprising in combination, a deck frame, a pair of decks extending lengthwise of the frame in substantially parallel relation and supported by the frame for movement toward and from each other along transversely inclined paths, means for forcing the decks away from each other up the inclined paths and then releasing them to move down the inclined paths under the influence of gravity with a jolting effect.

13. A concentrator table comprising in combination, a deck frame supported intermediate its ends upon a transverse axis for adjustment to different longitudinal inclinations, a pair of decks supported by the deck frame and movable toward and from each other, means located between the decks and upon opposite sides of the transverse axis to impart movement to the decks, and means rotating about said transverse axis to operate the deck moving means.

In testimony whereof, I have signed my name to this specification.

ALBERT H. STEBBINS.